Dec. 23, 1969　　　D. J. ANDERSON　　　3,486,115
MEANS FOR MEASURING THE POWER IN AN ELECTRICAL CIRCUIT
Filed March 31, 1966　　　　　　　　　　2 Sheets-Sheet 1

INVENTOR.
Donald J. Anderson
BY
ATTORNEYS

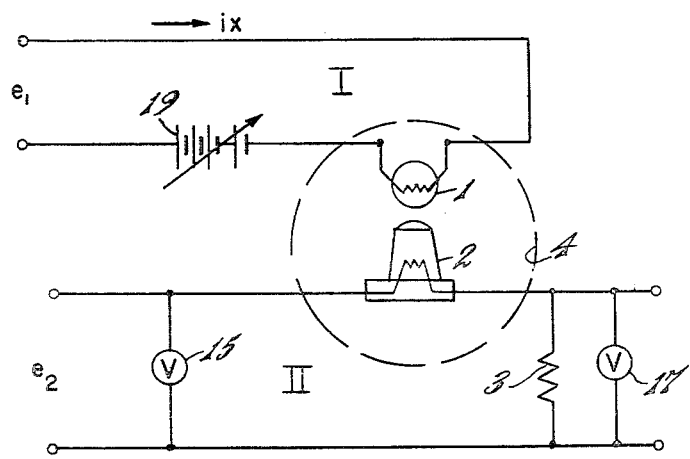

United States Patent Office 3,486,115
Patented Dec. 23, 1969

3,486,115
MEANS FOR MEASURING THE POWER IN AN ELECTRICAL CIRCUIT
Donald J. Anderson, 232 Rhoads Ave.,
Haddonfield, N.J. 08033
Filed Mar. 31, 1966, Ser. No. 539,084
Claims priority, application Great Britain, Apr. 1, 1965, 13,938/65
Int. Cl. G01r 11/32
U.S. Cl. 324—142                6 Claims

ABSTRACT OF THE DISCLOSURE

A method and means for obtaining the product of the power factor of an electrical circuit and an electrical current in said circuit in the form of a simple D.C. output voltage.

---

The present invention relates to a method and means for measuring the product of two or more complex A.C. electrical quantities and, in particular, to a method and means for obtaining the product of the power factor of an electrical circuit and an alternating current in this circuit in the form of a simple D.C. output voltage.

It is an object of the present invention to provide a method by which this product is obtained in a simple way and in such a manner that the product can be measured by instruments of normal design.

It is another object of the invention to provide means for carrying out the aforesaid method.

The invention will be explained in the following with reference to the accompanying drawings, in which:

FIGURE 4 is a circuit diagram showing how the method according to the present invention can be combined with that described in co-pending patent application Ser. No. 545,190, filed Mar. 31, 1966, for a Device for Multiplying or Dividing Variable Electrical Quantities By Each Other.

Figure 1:
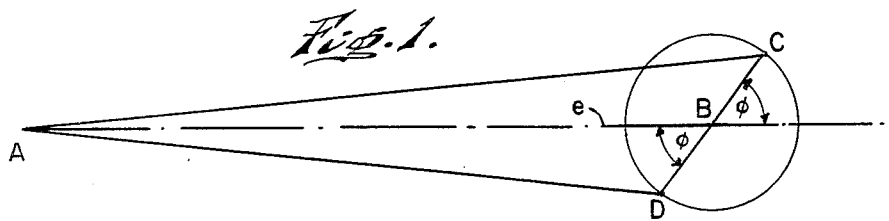
FIGURES 1 and 2 are vector diagrams of voltage and current in a circuit having a reactive or capacitive impedance.

In the vector diagram of FIGURE 1, a vector AB indicating a voltage $e$ is combined with a vector BC indicating a voltage which is both in phase with and proportional to current $+i$ and with another vector BD indicating a voltage which is both in phase with and proportional to current $-i$ for a given value of the power factor $\cos \phi$. The vector AC and AD in FIGURE 1 represent then the vectorial sums $(e+i)$ and $(e-i)$ respectively.

Figure 2:
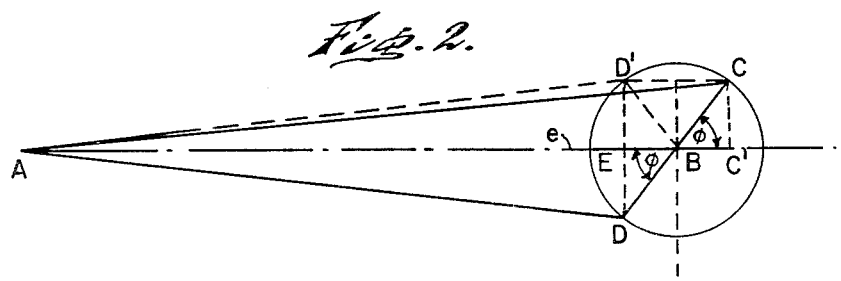

FIGURE 2 corresponds to FIGURE 1 with the modification that the vector AD has been reflected, so to speak, on the base line AB and is shown in dotted lines at AD' on the same side on the base line AB as the vector AC.

Assuming that the voltage $e$ is considerably greater than the voltage which is proportional to the current $i$, say at least five times greater, or more, then the angle BAC will become very small, and the angles BAC and BAD will approach equality. Lines AC and AD' will then approach coincidence. Under these conditions, the scalar subtraction of line AD' from the line AC is approximately equal to line D'C. As can be seen easily from FIGURE 2, $$D'C = EC' = 2i \cos \phi \qquad (1)$$

In order to obtain a value representing $2i \cos \phi$, it is therefore only necessary to subtract from each other the scalar values of the two vectors AC and AD', which are $(e+i)$ and $(e-i)$ respectively. Error is extremely small when the value of $e$ is $\geq 6$ times that of the voltage representing the current $i$.

Figure 3:
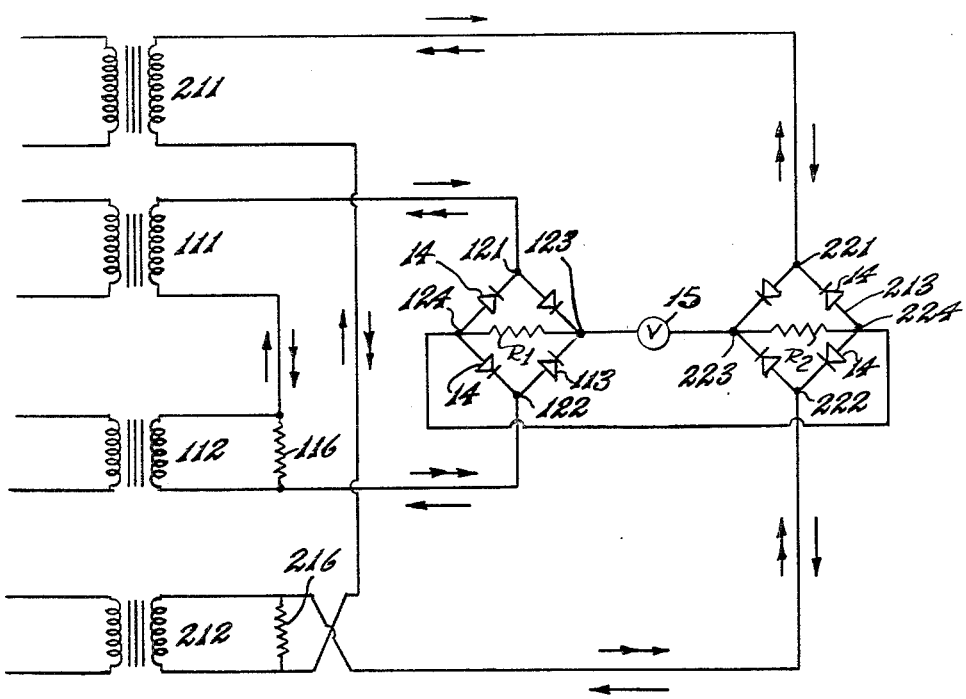
FIGURE 3 is a circuit diagram showing how the invention can be carried out in practice.

The circuit diagram of FIGURE 3 shows by way of example how this can be accomplished electrically, and the term $2i \cos \phi$ is produced as an electrical quantity which can be measured with an electrical instrument of normal design.

The circuits shown in FIGURE 3 include two voltage transformers 111 and 211, both of similar design and capacity, producing substantially identical output voltages representing the voltage, $e$, and two current transformers 112 and 212, both again of similar design and capacity, producing substantially identical output currents representing the current $i$. The secondary windings of transformers 111 and 112 are in series with each other in one circuit, and the secondary windings of transformers 211 and 212 are in series with each other in another circuit, but with their current transformer conections reversed with respect to those of the first circuit. Hence, the voltage produced by the first circuit will be equal to a value representing $(e+i)$ while the voltage produced by the second circuit will be equal to a value representing $(e-i)$.

Each of these two circuits has a separate fullwave bridge rectifier 113 and 213 respectively. In each of the four branches of each bridge there are rectifying devices 14 of any suitable and well-known design which, as is also well-known, are so arranged in the branches as to permit in each branch only unidirectional flow of current. As shown in FIGURE 3, the rectifiers are so arranged that current cannot flow through either of the two bridges 113 and 213 direct from one end terminal 121 (or 221) to the other diagonally opposite end terminal 122 (or 222) of the same bridge without flowing through the corresponding resistor R1 on bridge 113 and R2 on bridge 213. Voltmeter 15 is connected between two corresponding middle junctions 123 and 223 of the two bridges while the other corresponding middle junctions 124 and 224 are directly connected to each other. The voltage difference between the two bridges is measured by the instrument 15 which may be a D.C. voltmeter of normal design.

The current transformers 112 and 212 are provided with shunt resistors 116 and 216 so that the current flowing from the current transformers through their respective resistors will provide a voltage which is both in phase with and proportional to the current. Filter capacitors may be provided in the bridges 113 and 213 to eliminate any alternating current from the D.C. circuit. A further filter capacitor may be provided across the instrument 15.

As stated before, the circuit with the bridge rectifier 113 will carry the current $(e+i)$, and the circuit with the bridge rectifier 213 will carry the current $(e-i)$. Due to the arrangement as shown of the rectifying devices 14 in the two rectifiers, the A.C. driving current supplied by the transformers 111, 112 and 211, 212 will flow always in the same direction through resistors R1 and R2, whatever the phase of the A.C. current. The flow of current in the various circuits is indicated in FIGURE 3 by single-headed arrows for the positive phase and double-headed arrows for the negative phase of the A.C. current.

It will be seen from the foregoing that the voltage drop across voltmeter 15 must be in direct proportion to the difference of the two voltages $(e+i)$ and $(e-i)$ which are fed to these resistors from the bridge rectifiers 113 and 213 respectively. As shown above, this voltage drop is proportional to $2i \cos \phi$; it is measured by a D.C. instrument of normal design.

The aforedescribed evaluation of the term $2i \cos \phi$ may be utilized with advantage in those cases where this term is to be multiplied witth another quantity, such as the voltage of the circuit with the current $i$, whereby a product representing $ei \cos \phi$ is obtained. A suitable method of multiplying by each other two electrical quantities, such as the term $2i \cos \phi$ and $e$ respectively is described in our copending United States patent application No. 545,190, filed Mar. 31, 1966, and as shown in FIGURE 4.

According to this latter application and in FIGURE 4, two separate electrical circuits are provided. One (the primary) circuit includes a component capable of emitting light or heat rays as a function of its applied voltage. A second (the secondary) circuit contains a component or constituent whose resistance is a function of the radiation to which the latter component is exposed by the former. The component in the primary circuit may be a source of light or heat, and the component in the secondary circuit, a light- or heat-sensitive resistance, for instance, a photo-electric cell. As is well-known, the resistance of such a cell decreases with the increase of light to which it is exposed or, in other words, the resistance of the component in the secondary circuit is an inverse function of the current in the primary circuit.

FIGURE 4 is a circuit diagram showing how the method according to the present invention can be combined with that described in our copending patent application No. 545,190 for measuring the product of $ei \cos \phi$, and thereby the power of an electric circuit.

In FIGURE 4, I designates the primary and II the secondary circuit. A voltage $e_1$ is applied to the primary circuit I. A light bulb 1 is included in circuit I and a light-sensitive cell 2 in circuit II. The latter circuit contains further a resistance 3 which, in conjunction with a bias battery 19 performs a function to be described later in our copending patent application No. 545,190. The light bulb 1 and the light-sensitive cell 2 may be of any suitable and well-known type and are enclosed together in a light-proof casing 4 indicated diagrammatically in FIGURE 1 by dotted lines.

The circuit I is connected to a D.C. voltage source which produces in this circuit a current $i_x$. The circuit II is connected to a circuit, not shown in detail in FIGURE 4 as it is similar to that shown in FIGURE 3, the connection being effected at the two terminals of the instrument 15 of FIGURE 3. As explained before, the output at the terminals of the instrument represents the term $2i_y \cos \phi$ where $i_y$ is the current in the circuit having a power factor $\cos \phi$.

As explained in our copending patent application No. 545,190, filed Mar. 31, 1966, the D.C. voltmeter 17 in circuit II will indicate a value representing the product in the circuits I and II, or, in other words, a product equal to $e_1 \times e_2$ where $e_2$ is proportional to $2I \cos \phi$. This term is proportional to the power in the circuit from which $e_1$ and $e_2$ are obtained.

For use in association with alternating current circuits, the voltage $e_1$ may in conventional manner be made suitably proportional to the desired alternating voltage. For example, the voltage $e_1$ may be the voltage drop across all or a portion of a resistor connected in series with an appropriate rectifier across the desired portion of the alternating current circuit.

Thus, it is possible to measure the power of a circuit by very simple means which, apart from resistances, include only a light bulb and light- or heat-sensitive cell. No friction-producing delicate parts are required. The device is very stable. inexpensive, accurate and generally independent of the frequency of the A.C. circuit being measured.

Instead of the voltage $e_1$ in the circuit I representing the voltage to be multiplied by $e_2$ in circuit II, it is, of course, also possible to do the converse.

As explained in our copending patent application No. 545,190, filed Mar. 31, 1966, it is a condition that the change of the resistance in the circuit II, in response to changes of the voltage in the circuit I, have a linear characteristic. To this end, the bias battery 19 is provided in circuit I. This bias battery in conjunction with the resistor 3 in circuit II effectively produces a linear relationship between changes in voltage $e_1$ and the total resistance of circuit II over the range of voltage $e_2$ being utilized.

It is, of course, understood that the input voltages or currents to the multiplier may be of either the alternating or direct type.

Having thus described my invention, what I claim as new and desire to secure by Letters Patent is:

1. A device for measuring power in an alternating current circuit which comprises first circuit means for establishing voltage sources proportional respectively to a voltage of said circuit and to said current and for connecting them additively in series and having output connections, second circuit means for establishing voltage sources having voltages substantially identical with the voltages of the voltage sources of said first circuit means and for connecting them subtractively in series and having output connections; rectifier means connected to the output connections of said first circuit means; a resistor across the output of said rectifier means; second rectifier means connected to the output connections of said second circuit means; a resistor across the output of said second rectifier means; one terminal of each resistor being connected together; a primary electrical circuit containing a fixed voltage source; a voltage driven radiating device; a pair of input terminals connected to said radiating device and said source for energizing by a first external voltage; an electrical isolated secondary electrical circuit with input terminals connected across the other terminals of said resistors, and including a fixed resistor; a component connected to said input terminals of said secondary circuit which varies its resistance with only those received radiations which emanate from the primary radiating device; and readout means responsive to the current flowing in said secondary circuit.

2. A device of claim 1 in which said rectifier means and said resistors are so connected that with respect to the voltage across said other terminals of said resistors the voltage drop components in said resistors which are responsive to the voltage of said circuit cancel each other.

3. A device of claim 1 wherein the voltages of the voltage sources which are proportional to the voltage of said circuit are greater than about six times the voltages of the voltage sources which are proportional to said current.

4. A device of claim 1 in which said first and second rectifier means are fullwave rectifiers and said resistors are substantially identical.

5. A device of claim 1 wherein the respective currents in said resistors flow toward the common terminal, whereby said voltage responsive means is responsive to the difference in the voltages across the resistors.

6. A device of claim 1 wherein said radiating device is a light bulb and said component is a light-sensitive cell.

References Cited

UNITED STATES PATENTS

| 1,871,710 | 8/1932 | Lenehan | 324—142 X |
| 2,181,321 | 11/1939 | Friedlander | 324—140 X |
| 3,226,641 | 12/1965 | Miller | 324—142 |
| 3,331,022 | 7/1967 | Maione | 324—96 |

ALFRED E. SMITH, Primary Examiner

U.S. CL. X.R.

324—96, 140; 235—194